Figure 1:
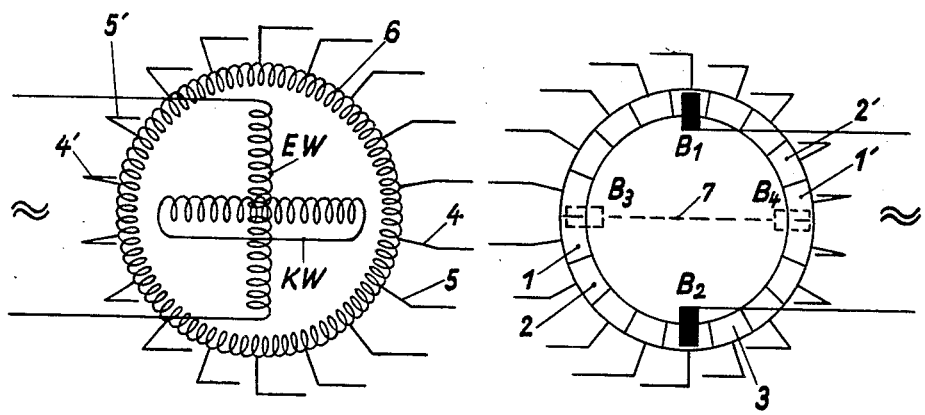

June 24, 1941.    A. KRÜSSMANN    2,246,887
ELECTRICALLY OPERATED DEVICE FOR TRANSMITTING ANGULAR MOVEMENT
Filed Oct. 3, 1940

Inventor:
Adolf Krussmann
By A.D.Adams
Attorney

UNITED STATES PATENT OFFICE 2,246,887

ELECTRICALLY OPERATED DEVICE FOR TRANSMITTING ANGULAR MOVEMENT

Adolf Krüssmann, Berlin-Wilmersdorf, Germany, assignor to Askania-Werke A. G., a corporation of Germany Application October 3, 1940, Serial No. 359,620
In Germany October 6, 1939

4 Claims. (Cl. 172—239)

The invention relates to an improvement in an electrically operated device for transmitting angular movement in which the transmitter consists in a commutator which has rotatable brushes and to whose conducting segments the taps of the rotary field winding of a receiver motor are connected. If the commutator brushes are fed by alternating current, a rotary alternating magnetic flux is created in the rotary field winding of the receiver motor which causes a follow-up movement of the rotor of the receiver.

The invention more particularly relates to an electrically operated angular transmission system of the above mentioned type in which, for amplifying the torque, there is mounted on the receiver rotor a short circuited winding having a straight axis, said winding constantly tending to adjust itself perpendicularly to the alternating stator flux. Experience has proved that the rotor of such a system on account of its being practically undampened oscillates in an undesirable manner about the desired position, such oscillations amounting to up to 45°. These oscillations are particularly disturbing where the instrument is designed as a torque amplifier. Due to the oscillations of the rotor such systems are likewise unsuited as regulating devices with short closing periods. The difficulty is not overcome by dampening the rotor movement by means of a brake, for instance an eddy current brake, as thereby the power of the system is severely impaired. It is therefore the object of the invention to provide means for dampening the rotor movement of systems of the kind described and for eliminating detrimental oscillations without essentially reducing the electric power of the system.

For a better understanding of the object of the invention reference should be had to the drawing in which—

Figure 2:
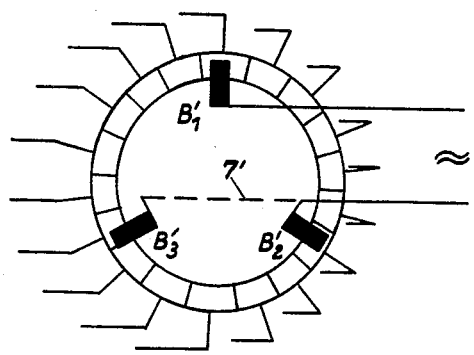

Fig. 1 is a complete wiring diagram of the transmitter and receiver for transmitting angular movement according to the invention, and Fig. 2 shows a modified form of the transmitter according to Fig. 1.

In the arrangement according to Fig. 1 the transmitter is represented by a stationary ring 3 having 18 conducting segments insulated against each other. The diametrical segments are designated by the numerals 1, 1', 2, 2' etc. Two A. C. fed brushes $B_1$, $B_2$ which are rotatably mounted and slide diametrically on the commutator ring, are revolved in response to a primary movement. A receiver motor of the rotary field type has a stationary annular winding 6 which possesses 18 taps corresponding to the number of commutator segments, the taps being disposed at equal intervals over the annular winding. The diametrically arranged taps 4, 4', 5, 5' are connected to two diametrically opposed segments 1, 1', 2, 2', respectively, of the commutator ring. Thus an A. C. will flow from the brushes $B_1$, $B_2$ over two diametrically arranged commutator segments to two corresponding taps of the receiver winding 6 and then through the parallel-connected halves of the annular winding 6, thereby producing in that winding an alternating magnetic field rotating corresponding to the rotation of the commutator brushes $B_1$, $B_2$. The rotor of the receiver motor carries an exciting field winding EW and a short circuited winding KW, both windings having straight axes and being perpendicular to each other. The winding EW is connected to the A. C. source feeding the brushes $B_1$ and $B_2$. In the present embodiment the winding EW might be dispensed with. This winding constantly tends to adjust the rotor into the direction of the alternating field produced in the winding 6 while amplifying this field by induction. The entire power of the A. C. field in the winding 6 is supplied partly directly from the brushes $B_1$, $B_2$ and partly by induction from the winding EW.

The winding KW is short circuited. This winding constantly tends to adjust itself vertically to the alternating stator flux. If this relative position does not exist, an electromotive force is induced in the short circuited winding producing a current of considerable amount which likewise produces a torque which is zero if the axes of the stator field and of the winding KW are at right angles to one another, i. e. if the transmitter and the receiver are in the normal position to one another. Now according to the invention two further brushes $B_3$ and $B_4$ are mechanically coupled with the brushes $B_1$ and $B_2$. This pair of brushes $B_3$, $B_4$ is arranged vertically to the brush pair $B_1$, $B_2$ and is short circuited by means of a conducting bar 7. In the synchronous position of the transmitter and the receiver the two brushes $B_3$ and $B_4$ connect commutator segments of equal potential. But as soon as the rotor of the receiver deviates from the desired position, an A. C. component is induced in the stator winding 6 by the winding KW which component compensates itself over the short circuiting bar 7. The system described represents an induction system, the primary part of which is the short circuit winding KW induced by the alternating stator filed and the secondary part of which is formed by the two halves of the rotary field winding 6 which are short circuited by means of the bar 7. In consequence a mechanical power is required to move the primary part of the induction system, i. e. the short circuited winding KW. It is obvious that this power consumption produces a dampening effect on the rotor movement. It is to be noted that the dampening effect referred to exists only when the rotor and with it the winding KW tends to deviate from the desired position.

The basic principle of the invention may likewise be realized by using three brushes $B_1'$, $B_2'$ and $B_3'$ preferably spaced at 120° intervals sliding on the commutator ring instead of the crossed brushes $B_1$—$B_4$ as shown in Fig. 2, of which three brushes two, namely $B_2'$ and $B_3'$ are short circuited by means of a connecting bar $7'$ and connected with one pole of the A. C. source, while the third brush $B_1$, is connected to the second pole of the A. C. power source. Such an arrangement affords the advantage that the friction of the brushes and the mechanical stress of the commutator is reduced, provided, however, that the brushes contact well with the commutator as in the case of a passing lifting of a brush there is the possibility of the receiver rotor falling out of step. In this arrangement the brushes $B_2'$ and $B_3'$ in the desired position of the receiver rotor likewise connect commutator bars of equal potential, while at a deviation of the rotor from the desired position due to the inducing of the rotary field winding by the short circuited winding, a compensating current flows in the short circuit connection $7'$ which has a dampening effect on the short circuit winding KW.

The arrangement may also be made in such manner that the feeding brushes $B_1$ and $B_2$ of Fig. 1 are dispensed with provided that the receiver rotor possesses the A. C. fed exciting winding EW. In such a system the alternating magnetic flux in the rotary field winding 6 is produced exclusively through the winding EW while the two short circuited brushes $B_3$ and $B_4$ merely revolve on the commutator 3 in response to the primary movement. This system operates as follows:

If the brushes $B_3$ and $B_4$ are deflected from their neutral position, a potential drop is produced in the brushes with the result that an A. C. component flows through the two winding halves of the rotary field winding 6 short circuited by the brushes $B_3$, $B_4$, said component deflecting the alternating flux in the rotary field winding 6 by the angle of the brush deflection. Subsequently the short circuit winding KW, i. e. the rotor carrying the exciting winding EW, again resumes its vertical position relative to this deflected or distorted magnetic flux. Thus, an angular movement of the alternating flux in the rotary field winding 6 is obtained indirectly by means of the short circuit winding KW and the rotatable brush short circuit 7.

What I claim is:

1. An electrically operated device for transmitting angular movement comprising an annular commutator consisting of a plurality of conducting segments insulated from each other and a plurality of turnably mounted sliding brushes; said brushes being simultaneously rotatable in dependence on the angular movement to be transmitted; an electric motor having a stator carrying an annular rotary field winding and possessing a rotor carrying a short circuited winding; said short circuited winding having a straight axis; said annular stator winding having a number of circumferentially disposed taps connected to corresponding circumferentially disposed commutator segments; means for producing an alternating magnetic field in the rotor rotated synchronously with the commutator brushes; a number of said commutator brushes being arranged along the periphery of the annular commutator so as to contact with commutator segments having the same potential at the normal relation between the commutator brushes and the rotor of the motor and having different potentials when the position of the commutator brushes deviates from that of the rotor; and means for short circuiting said number of commutator brushes.

2. Electrically operated device for transmitting angular movement comprising an annular commutator consisting of a plurality of conducting segments insulated from each other and two pairs of turnably mounted sliding brushes arranged at right angles to one another and diametrically to the annular commutator; both brush pairs being simultaneously rotatable in dependence on the angular movement to be transmitted; an A. C. electric power source; one brush pair being connected to said A. C. power source; the other brush pair being short circuited; an electric motor having a stator carrying an annular field winding and having a rotor carrying a short circuited winding; said short circuited winding having a straight axis; and said annular stator winding having a number of circumferentially disposed taps connected to corresponding circumferentially disposed commutator segments.

3. An electrically operated device for transmitting angular movement comprising an annular commutator consisting of a plurality of conducting segments insulated from each other and a short-circuited pair of turnably mounted sliding brushes arranged diametrically to the annular commutator and rotatable in dependence on the angular movement to be transmitted; an electric motor having a stator carrying an annular rotary field winding; said annular stator winding having a number of circumferentially disposed taps connected to corresponding circumferentially disposed commutator segments; the rotor of the motor carrying two windings having straight axes arranged at right angles to one another and one of said windings being short circuited and the other connected to an A. C. power source.

4. An electrically operated device for transmitting angular movement comprising an annular commutator consisting of a plurality of conducting segments insulated from each other and three turnably mounted sliding brushes spaced at 120° intervals relative to the annular commutator; an A. C. power source; two of said brushes having the same potential at the normal relation between the commutator brushes and the rotor of the motor and being short circuited and connected to one terminal of said A. C. power source; the third brush being connected to the other terminal of said A. C. power source; an electric motor having a stator carrying an annular rotary field winding and having a rotor carrying a short circuited winding; said winding having a straight axis; and said annular stator winding having a number of circumferentially disposed taps connected to corresponding circumferentially disposed commutator segments.

ADOLF KRÜSSMANN.